(12) United States Patent
Nóbrega

(10) Patent No.: US 7,878,508 B2
(45) Date of Patent: Feb. 1, 2011

(54) COMPACT RESTICTIVE SEAL FOR BEARING HOUSINGS

(75) Inventor: Paulo Roberto Leite Nóbrega, São Vicente (BR)

(73) Assignee: Petróleo Brasileiro S.A.- Petrobras, Rio de Janeiro (BR)

( * ) Notice: Subject to any disclaimer, the term of this patent is extended or adjusted under 35 U.S.C. 154(b) by 0 days.

(21) Appl. No.: 12/659,233

(22) Filed: Mar. 1, 2010

(65) Prior Publication Data
US 2010/0225065 A1    Sep. 9, 2010

Related U.S. Application Data

(63) Continuation of application No. 12/422,419, filed on Apr. 13, 2009, now abandoned.

(30) Foreign Application Priority Data
Aug. 29, 2008    (BR) .................................. 0803690

(51) Int. Cl.
*F16J 15/447*    (2006.01)
*F16J 15/34*    (2006.01)

(52) U.S. Cl. .................. 277/352; 277/412; 277/418
(58) Field of Classification Search .................. 277/352, 277/407, 412, 418–420, 423, 427
See application file for complete search history.

(56) References Cited

U.S. PATENT DOCUMENTS

| | | | |
|---|---|---|---|
| 5,024,451 | A | 6/1991 | Borowski |
| 5,158,304 | A | 10/1992 | Orlowski |
| 5,174,583 | A | 12/1992 | Orlowski et al. |
| 5,951,020 | A | 9/1999 | Orlowski |
| 6,062,568 | A | 5/2000 | Orlowski et al. |
| 6,390,477 | B1 | 5/2002 | Drago et al. |

*Primary Examiner*—Vishal Patel
(74) *Attorney, Agent, or Firm*—Nixon & Vanderhye PC

(57) ABSTRACT

This invention relates to a restrictive seal of the labyrinth type of reduced external size. The invention has an inner deflector which is capable of retaining the lubricating oil within the bearing housing with great efficiency, and a highly accurate system for adjusting and aligning the elements of the labyrinths, ensuring an infinite service life. Because it has very much smaller external dimensions it can be applied as a replacement to the lip seals commonly in use without causing problems to accessory equipment connected to a pump.

9 Claims, 3 Drawing Sheets

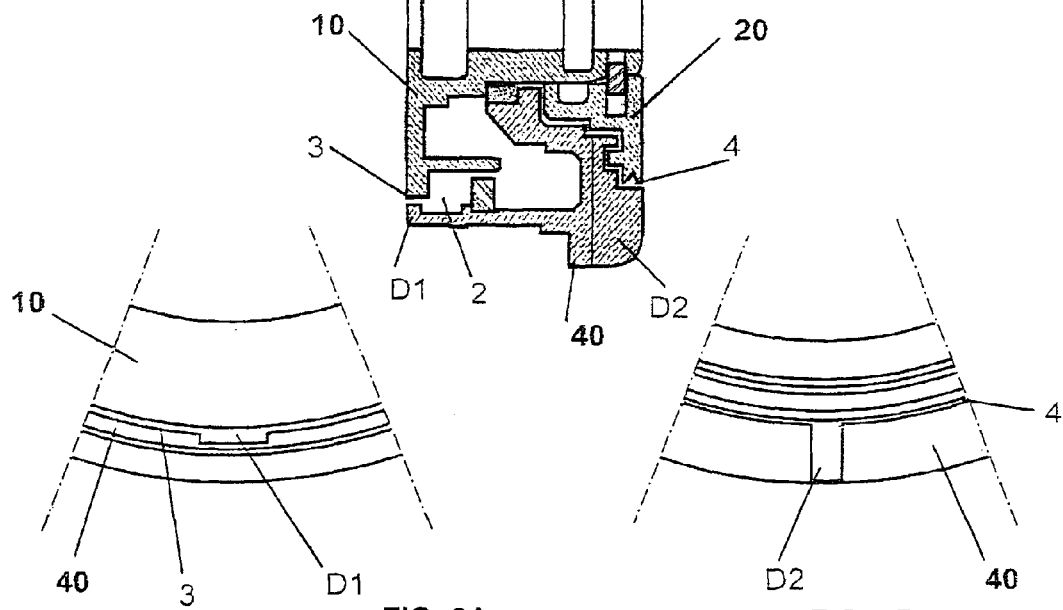
FIG. 3
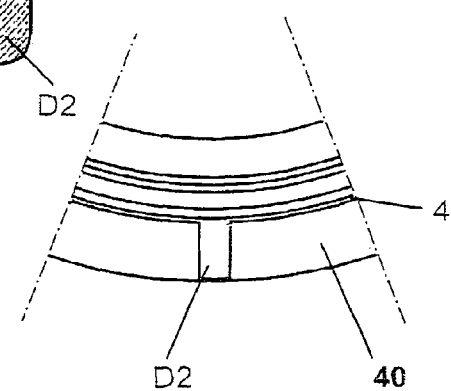
FIG. 3A
FIG. 3B

COMPACT RESTICTIVE SEAL FOR BEARING HOUSINGS

CROSS-REFERENCE TO RELATED APPLICATION

This application is a Continuation of application Ser. No. 12/422,419, filed Apr. 13, 2009, the entire contents of which are hereby incorporated by reference into this application. This application is also based on and claims priority from Brazilian Patent Application No. PI0803690-0, filed on Aug. 29, 2008, the contents of which are hereby incorporated by reference into this application.

FIELD OF THE INVENTION

This invention relates to a compact restrictive seal for bearing housings for the bearings of rotary equipment in general. The seal is provided by an internal labyrinth which is capable of retaining the lubricating oil within the bearing housing in a highly efficient way and preventing moisture or dirt from entering. It also has very small external dimensions, and can be used as a replacement for the lip seals commonly in use without causing problems to the accessory equipment connected to a pump.

DESCRIPTION OF THE RELATED ART

The oil industry, and the various processes which it involves, frequently makes great use of various models of centrifugal pumps.

Once extracted at production platforms, oil passes through a great variety of means of transport, such as oil pipelines or tankers, and in the main, in the process specifically referred to as refining, in specific industrial facilities, it has to be pumped through thousands of metres of pipe and hundreds of systems, which in popular language are known as the processes of oil extraction and refining.

Thus the most important components, and the ones most subject to wear in the oil industry, are pumps, which are used in a variety of applications, and which may be present in a variety of models and power, requiring great attention when specifying and maintaining them.

As these are essential components in any stage of processing in the oil industry, many pumps are used continuously, only being shut down if a fault occurs or for programmed maintenance.

Pumps have bearings within the bearing housing which are sensitive to any contaminant from the environment in which the pump is operating. They also have a component, which is particularly subject to failure, which isolates the bearings within the bearing housing from the external environment, and also prevents any trace of lubricant from the interior of the bearing housing from contaminating the environment.

At the present time many pumps present in industrial facilities were originally designed using lip seals as the isolating member, fitted in such a way that they are always located in the space included within the thickness of the bearing housing. They do not occupy any space beyond the internal or external surfaces of the bearing housings, and much operating equipment has been designed accurately to fit these pumps.

However, lip seals have a very short service life and low resistance to the pressure of the oil vapour which can be generated within bearing housings; in some cases lip seals do not last three months' operation. Thus lip seals which have already been fitted need to be replaced by a device which is more efficient and durable, and this is a seal.

In this respect standards have been created to establish minimum parameters to provide maximum satisfaction for these isolating conditions, and which make lip seals obsolete. One of these standards is the American Petroleum Institute Standard API 610, $9^{th}$ edition (2003), which states:

"5.10.2.7—Bearing housings shall be designed to prevent contamination by moisture, dust and other foreign matter. This shall not be achieved through the use of compressed air injection, but through the use of labyrinth or magnetic-type seals in those places where the shaft passes through the housing".

Nevertheless, complying with this requirement through using a seal of the labyrinth type is also extremely difficult because the majority of these seals available on the market allow oil to flow from the bearing housing under severe operating conditions. The problem is made worse when an attempt is made to use seals dimensioned with reduced thickness as a replacement for old lip seals already fitted in earlier work.

Despite seals of the labyrinth type being slightly cheaper than hermetic seals, having a technically indefinite service life, any failure gives rise to great losses for the petroleum industry, in particular when all the hours during which the production processes involved are shut down during repairs, or the environmental harm resulting from such flows, are taken into account. The costs in man/hours of overcoming all these problems are high, as is also the harm of possible adverse repercussions on a company involved in environmental accidents.

Direct losses have been measured as a result of investigations which demonstrated seal failure in the inward direction, where the presence of only 0.02% of water in the bearing oil was sufficient to reduce the useful life of the bearings by up to 48%. Indirect losses could be even greater, because of the possibility of a seal failure in the inward/outward direction giving rise to an oil leak and causing a company to have a negative image in environmental terms.

Any unscheduled shutdown, especially those caused by failure of the bearing housing seal, not only interrupts the process of which the particular pump is a part but also invariably damages various components of the pump.

There are various models of labyrinth-type seals designed according to current standards, but one of the greatest concerns of the engineers responsible for pump maintenance is to be able to replace the lip seals fitted on former occasions by seals available on the market so as to avoid failures, especially in the case of centrifugal pumps. Labyrinth-type seals, when free from defects, are those most indicated for these applications because of a number of basic considerations.

They are a device having smaller axial dimensions, which allow a greater possibility for adjustment when they replace a lip seal in equipment with little internal space.

The second reason is of an economic nature. As the number of items of equipment which need to be adapted is very high and labyrinth-type seals offer the lowest cost among the seals available on the market, this is the option which generates greatest interest.

Given that every pump needs at least two seals, and that around 1000 pumps are used in a medium-sized refinery, the economic factor caused by the impact of the application of these components is clearly apparent.

Nevertheless the labyrinth seals currently available on the market, despite being a cheap option, have a number of problems which also make their use subject to special attention.

Despite their advantages, some of the labyrinth-type seals most currently in use in the oil industry also have disadvantages which give rise to premature failures or the need for periodical maintenance.

By way of example, one of the labyrinth-type seals most widely used at the present time is the INPRO-VBX®.

Although thin, these seals also have an axial thickness which may cause problems when they are used as replacements for old lip seals.

They have already given rise to isolation failures when subjected to severe operating conditions, or even when there is occasionally an excess of lubricating oil in the bearing housing.

Isolation failures have also been detected in the inward/outward direction, because the passage area in the labyrinth has poor retaining properties. It can be seen that all the labyrinth-type seals currently available on the market have a single deflector located on the outside surface and therefore do not provide any extra protection in the inward/outward flow direction.

Another technical disadvantage encountered in the use of this device is the difficulty of fitting or removing it, because a press has to be used. Apart from the fact that use of a press gives rise to operational difficulties, it may result in alignment problems, which will consequently give rise to a failure of isolation in either direction, inwards or outwards.

Alignment is a condition which is very difficult to achieve in seals for bearing housings with the models currently in existence, because the seat is in a stationary condition, and the primary seal is fixed in a rotating sleeve. In turn present sleeves are provided with a single "O" ring. This construction of the sleeve with a single "O" ring can give rise to misalignment during installation.

In the models currently in existence on the market perfect alignment is only achieved through very careful fitting work, preferably calibrated using a centering-comparison gauge. This is a task which in addition to requiring special tools requires time, and has to be carried out by a specialist engineer.

It is also important to point out that being imported products they have an additional cost, in addition to requiring logistics on the part of the stores department so that there is never any shortage, especially in emergency situations.

Thus, no matter how good the quality of the isolation, the alignment and the availability offered by labyrinth-type seals, what would be better would be equipment which is durable. It is because of this that design engineers in the oil industry try to exceed the requirements of API Standard 610, $9^{th}$ ed. (2003), and create their designs to ensure that the sealing of bearing housings with labyrinth-type seals overcomes the problems currently in existence, especially in centrifugal pumps.

The object of this invention is to provide a labyrinth-type seal for bearing housings which fully meets API Standard 610 for this type of seal. Other objectives which the compact restrictive seal for bearing housings to which this invention relates is intended to accomplish are listed below:
a. Improving the seal to prevent oil leaks to the environment,
b. Improving the seal to prevent the entry of contaminants from the environment into the bearing housing,
c. Improving protection against jets of liquids,
d. Improving the seal in situations where there is excess oil in the housing,
e. Reducing the need for specialist professionals to carry out the work of fitting mechanical seals,
f. Eliminating the need for a press to fit the seal,
g. Provision of a longer service life and for the pump in which it is fitted,
h. Easier fitting through self-regulating alignment,
i. Fitting with axial adjustment provided by the seal itself,
j. A rotary seat,
k. Use of less external space,
l. Possibility of use on pumps, specifically centrifugal pumps,
m. Possibility of use in a wide range of rotary equipment such as: electric motors, mixers, reduction gears, turbines, etc.

SUMMARY OF THE INVENTION

This invention relates to a labyrinth-type seal which is easy to fit and remove, it is provided with a double deflector system and a two-function labyrinth system, and which is very much thinner than similar seals present on the market.

The invention comprises a set of known elements such as: sleeve, housing, labyrinths, sealing "O" rings, resilient rings and deflectors, arranged in such a way that their special configurations and construction features make it possible to produce a labyrinth which brings about maximum restriction of communication between the internal environment and the external environment of the bearing housing, and when fitted has a total thickness which is very much less than that of the seals currently in existence.

In its general lines the assembly is arranged as follows:

A circular sleeve with a profile of recumbent "J" shape in which the longer limb is parallel to the axis and whose free extremity is directed away from the bearing housing.

The next element forming the compact restrictive seal is a housing in which an expanding restraining ring and a centralising ring are fixed. The housing has a "J"-shaped profile in cross-section, with the longer limb parallel to the axis and pointing towards the interior of the bearing housing, where it is fixed. This longer portion of the housing is subdivided into two sections with specific functions, namely the first section is distinguished in that it is totally beneath the projection of the wall of the bearing housing and the second section is outside the bearing housing.

The inner face of the first section is provided with two successive channels; the expanding restraining ring is mounted in one of the channels so that the expanding restraining ring together with the subsequent channel, the smaller portion of the sleeve and the free extremity of the vertical portion of the said sleeve together form an internal labyrinth and an internal drainage chamber over the entire internal perimeter of the seal.

The second section does not wholly face the outer wall of the bearing housing, but is slightly separated from the outer wall of the said bearing housing by a tooth, thus forming a channel between the outer wall of the bearing housing and the outer body of the seal.

The vertical portion of the said housing has a shape which mirrors the inner face of an external deflector, and has at least one main channel which together with a tooth form an external drainage half-chamber. The free extremity of the shorter portion of the same housing, also in a direction parallel to the axis, faces the interior of the bearing housing.

The said free extremity of the shorter portion is provided with a toothed cavity around the entire perimeter of the housing, and a centralising ring, preferably comprising a polymer alloy, is fixed to this toothed cavity.

The final component of the seal which has to be connected is the external deflector, which has a closed circular shape, with an "L"-shaped profile in cross-section, its longer portion lying perpendicular to the axis and its free extremity having a "V"-shaped bevel, a tooth is provided downstream. This profile presented by the longer limb of the external deflector combines with the matching profile of the main channel and the tooth of the vertical portion of the housing.

The shorter portion of the external deflector parallel to the axis is provided with two channels, one at each extremity of the segment of the portion. The innermost channel is configured to seat the "O" sealing ring and the outermost channel houses a restraining ring. After the seal has been fitted the said ring is located in an intermediate position between the outermost channel and the sleeve channel.

BRIEF DESCRIPTION OF THE DRAWINGS

The invention will be described in greater detail below together with the related drawings below which accompany this description merely by way of example, being an integral part thereof and in which:

FIG. 3 shows a view in cross-section of the lower section of the compact restrictive seal.

FIG. 3A shows a frontal internal view of the lower section of the compact restrictive seal.

FIG. 3B shows a frontal external view of the lower section of the compact restrictive seal.

DETAILED DESCRIPTION OF THE INVENTION

The invention relates to a labyrinth-type seal for bearing housings mainly developed for application in centrifugal pumps. In addition to fulfilling its main objective of sealing, it is also dimensioned to be highly durable in severe operating conditions, occupying the minimum axial space beyond the external surface of the bearing housing.

In an alternative embodiment the compact restrictive seal for bearing housings is designed to provide two labyrinth sectors, one operating with reference to the inner surface of the bearing housing and the other to the outer surface. A better seal between the internal and external environments of the bearing housing throughout the entire service life of the pump is achieved in this way.

The compact restrictive seal for bearing housings is also designed so that centrifugal force presses the fluid, which maintains contact with the body of the seal, helping it to be leaktight.

Figure 1:
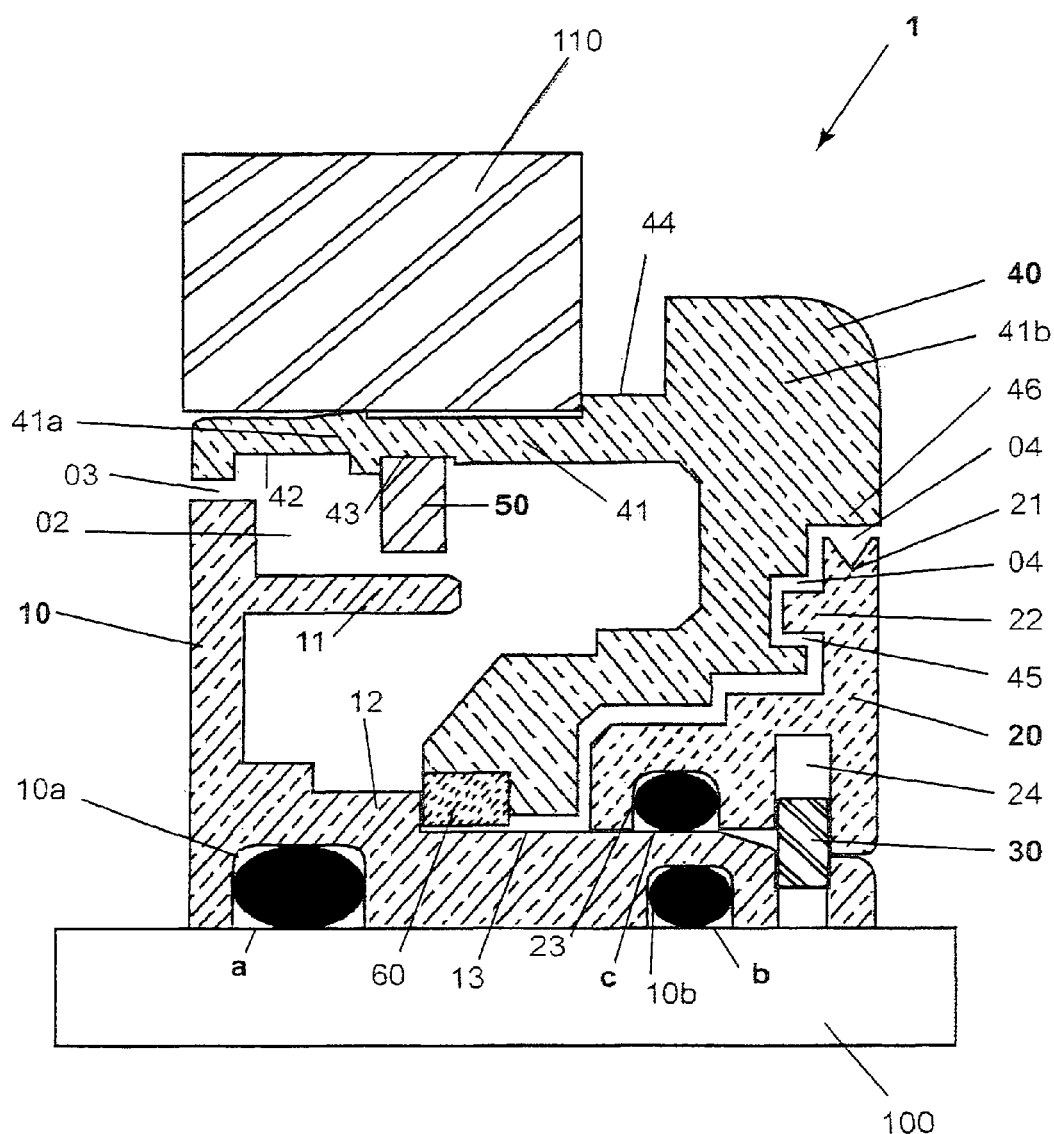
FIG. 1 shows a view in cross-section of the upper section of the compact restrictive seal mounted on a shaft in a bearing housing.

FIG. 1 shows a typical diagrammatical view in cross-section of the compact restrictive seal (1) mounted on a shaft (100) and coupled to a bearing housing (110). From FIG. 1 it will be seen that some components in one series are removably fixed to bearing housing (110) while others in another series are removably fixed to a shaft (100). Thus the restrictive seal for bearing housings (1) operates as one series of components following the rotation of shaft (100), while another series of components remains attached to bearing housing (110) and is therefore static.

Figure 2:
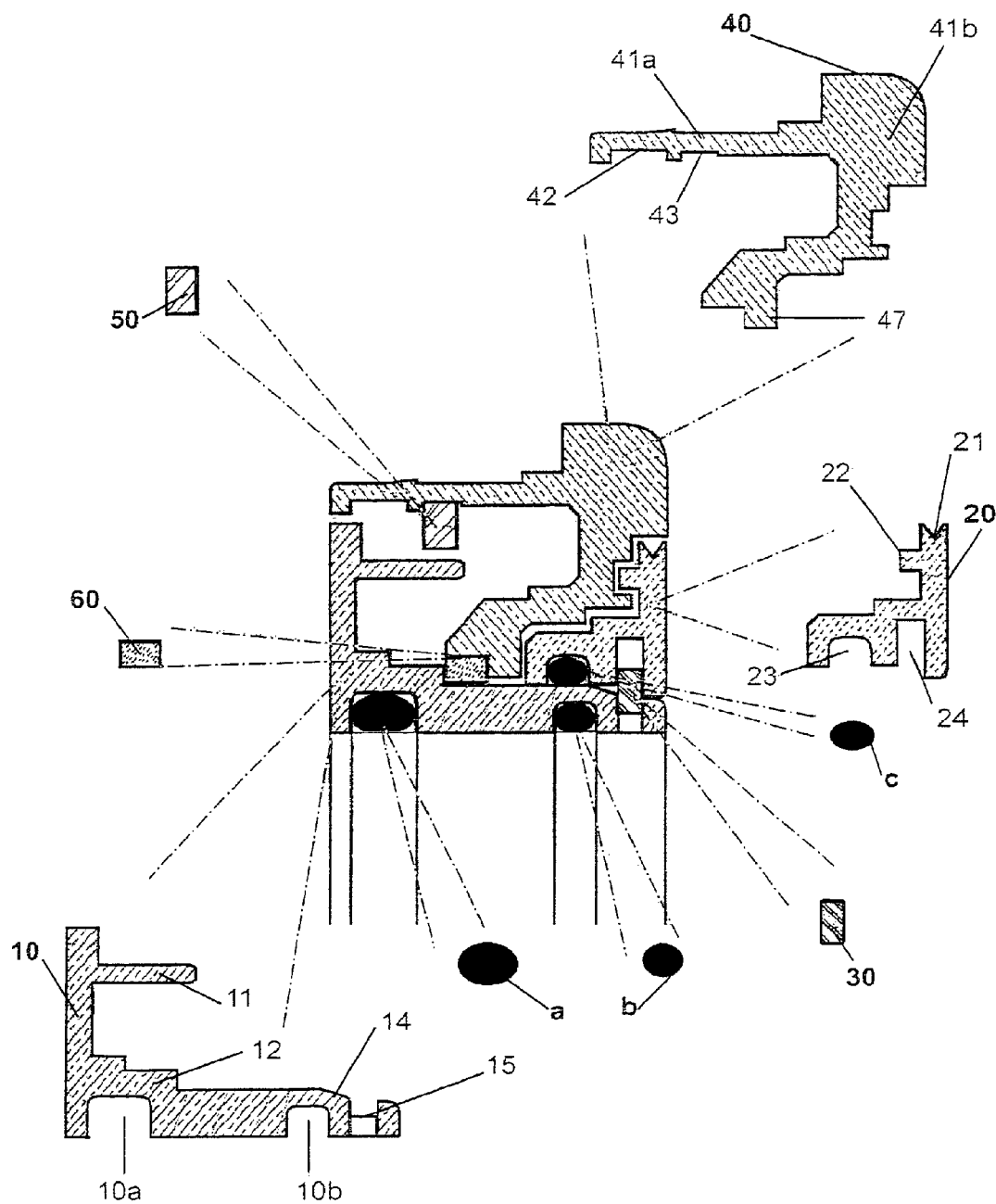
FIG. 2 shows an exploded cross-sectional view of the upper section of the components of the compact restrictive seal.

FIG. 2 shows in exploded view a preferred embodiment of the compact restrictive seal for bearing housings (1). In this view each of the constituent component of the compact restrictive seal for bearing housings (1) can be seen arranged in the order in which they are fitted, the said components basically comprising:

A) A sleeve (10) of closed circular shape with a profile in cross-section predominantly of a "J" shape which encloses a shaft (not shown in this figure).

B) An external deflector (20), of closed circular shape with a profile in cross-section which is predominantly of an "L"-shape, which as a result of the action of sealing "O" ring (c) rotates together with the movement of sleeve (10).

C) A restraining ring (30) of open circular shape having a profile in cross-section which is predominantly of polygonal and preferably rectangular shape and which when fitted connects sleeve (10) to external deflector (20).

In the opposite direction we have the following components all attached in series to the bearing housing (not shown in this figure), namely:

D) A housing (40) of closed circular shape having a profile in cross-section of predominantly "J" shape, which is attached directly to a bearing housing (110).

E) An expanding restraining ring (50) of open circular shape having a profile in cross-section which is predominantly of polygonal and preferably rectangular shape which also acts as part of an internal labyrinth.

F) A centralising ring (60) of closed circular shape having a profile in cross-section which is predominantly of polygonal shape, which is attached to the inner extremity of housing (40).

All these components are connected together and to bearing housing (110); as a consequence they are static in relation to shaft (100).

A detailed description of each component of compact restrictive seal (1) will be provided with the help of FIGS. 1, 2 and 3, so that their functions can be well understood.

The internal wall of sleeve (10) facing the surface of shaft (100) is provided with cavities (10a and 10b) to accommodate "O"-shaped sealing rings (a and b). "O" sealing rings (a and b) form a seal between the inner face of sleeve (10) and shaft (100). As "O" sealing rings (a and b) are located at the extremities of sleeve (10) they are also responsible for the perfect axial alignment of sleeve (10) on shaft (100).

This arrangement makes fitting of the compact restrictive seal to bearing housings (1) easier because it dispenses with the use of special alignment tools.

Obtaining perfect alignment is essential so that there is no wear on the elements comprising the labyrinths.

Sleeve (10) has a cross-section with a predominantly recumbent "J" shape in which a first portion extends parallel to shaft (100), a second portion perpendicular thereto which forms the other part of the "J" and a third smaller portion (11) at a distance from the former, also parallel to shaft (100), which acts as part of an internal labyrinth.

The longer portion has its free extremity directed away from bearing housing (100) and has two levels of thickness around its perimeter—a deeper level which acts as a supporting tooth (12) and restrains the near component, while the lower level (13) is the base for attachment of the "O" sealing ring (c) and external deflector (20) as shown in FIG. 1. At its free extremity there is also a bevel (14) ending in a channel (15) as shown in FIG. 2.

In the order in which they are fitted, the next element forming compact restrictive seal (1) is housing (40) with the attached expanding restraining ring (50) and centralising ring (60).

It can be seen from FIG. 1 that housing (40) has a profiling cross-section which is predominantly of a "J" shape, inverted in relation to sleeve (10), and it will also be seen that the longer portion (41) parallel to shaft (100) faces the interior of bearing housing (110), where it is attached.

This longer portion (41) of housing (40) is subdivided into two sections with specific functions, namely: the first section (41a) is distinguished in that it is wholly beneath the projection of the wall of the bearing housing, and the second section (41b) is distinguished by being outside the bearing housing.

The first section (41a) is provided with two channels (42) and (43), one after the other.

Expanding restraining ring (50) is fitted in channel (43). This ring has the essential function of pushing the longer portion (41) of housing (40) against bearing housing (110) so that seal (1) is firmly fixed in the housing. However, expanding restraining ring (50) has another function which is also important—together with channel (42) the smaller portion (11) of sleeve (10) and the free extremity of the vertical portion also of sleeve (10) form an internal labyrinth and an internal drainage chamber (2) along the entire internal perimeter of seal (1).

This internal labyrinth formed by the components described above, which is novel in seals of the labyrinth type, in addition to making the seal more leaktight in the event of a failure of the main labyrinth—which will be described below—also has the effect of restricting the force of the oil from the interior of the bearing housing against the said main labyrinth.

Any amount of oil which succeeds in penetrating through the narrow slot (3) which separates rotating sleeve (10) from housing (40) is directed towards internal drainage chamber (2) where it will tend to come into contact with the smaller portion (11) of sleeve (10). As this is also rotating the oil will be pushed against channel (42) through the action of centrifugal force, and the latter will in turn lead the flow to a specific drain—described below—provided in the bottom section of seal (1).

The second section (41b) of the longer portion (41) of housing (40) lies outside bearing housing (110), but does not wholly face the outer wall of bearing housing (110). Second section (41b) is held slightly away from the outer wall of the said bearing housing by a tooth (44), thus forming a channel between the outer wall of bearing housing (110) and the outer body of seal (1). This channel has the function of assisting dismantling of the seal, because it can provide a purchase for the tip of a blade acting as a lever.

The vertical portion of housing (40) has a shape which mirrors the inner face of external deflector (20) and has at least one main channel (45) which together with a tooth (46) forms an external drainage half-chamber (4). As in the case of internal drainage chamber (2), any liquid which comes into contact with external deflector (20) will be pushed outward by the centrifugal force generated in the fluid by external deflector (20).

Also in a direction parallel to shaft (100), the shorter portion of housing (40) has its free extremity directed towards the interior of bearing housing (110). The said free extremity is provided with a toothed cavity (47) around the entire perimeter of housing (40). Centralising ring (60) having a predominantly polygonal cross-section is attached to this toothed cavity (47).

Centralising ring (60) preferably comprises a weaker alloy than the material of sleeve (10), and in one embodiment TEFLON® impregnated with bronze in a percentage of 40% to 70% bronze, particularly a percentage of 55% bronze, has been used.

When seal (1) is fitted, centralising ring (60) acts as a tool which moves sleeve (10) into the precise operating position for the said seal. This is possible because of the interference between centralising ring (60) and tooth (12) of sleeve (10).

After seal (1) has been fitted, because of the force used in fitting there will be no play between these three elements—toothed cavity (47), centralising ring (60) and tooth (12) of sleeve (10). Nevertheless, as centralising ring (60) comprises a Poly(tetrafluoroethene)—PTFE alloy impregnated with bronze, immediately after the initial rotation of sleeve (10) there will be planned wear on the contact face of centralising ring (60). This wear will give rise to a very small play, which is nevertheless sufficient to prevent friction between the fixed and moving components of the compact restrictive seal (1) which is now proposed.

It should be pointed out that the configuration of the shorter portion of housing (40) as successive steps, together with the high precision adjustment between centralising ring (60) and tooth (12) of sleeve (10), act as a high performance main seal.

The last component of the seal which is to be attached is outer deflector (20) which has a closed circular shape with a profile in cross-section of predominantly an "L" shape. The longer portion of this component is located perpendicularly to shaft (100); its free extremity has a bevel (21) of "V" shape, and is provided on the downstream side with a tooth (22). This profile matches the profile of main channel (45) and of tooth (46) of the vertical portion of housing (40) forming the outer drainage half-chamber (4) mentioned above.

The shorter portion of outer deflector (20) which is parallel to shaft (100) is provided with two channels (23) and (24), one at each extremity of the segment of the portion. The innermost channel (23) is configured to house the "O" sealing ring (c). The outermost channel (24), preferably of polygonal shape, houses a restrictive restraining ring (30). As the said restrictive restraining ring is located in an intermediate position between the more external channel (24) and the channel (15) of sleeve (10) once it has been fitted, its mean diameter must be such that the two channels are perfectly in line.

Restraining ring (30) has two important functions:

Initially it prevents outer deflector (20) from moving beyond the ideal position of adjustment during fitting. Thus there is a guarantee that the profile matching main channel (45) and tooth (46) of the vertical portion of housing (40) never bears upon or moves away from outer drainage chamber (4).

Secondly it acts as a tool for removing sleeve (10) when housing (40) is extracted using a blade acting on tooth (44).

FIG. 3 shows a profile of compact restrictive seal (1) in cross-section, although as a lower segment of the said seal.

It is easy to see with the help of the internal frontal view (FIG. 3A) that there is a drain (D1) at the lowest point in seal (1). Drain (D1) drains all the oil pushed towards channel (42) of internal drainage chamber (2) to the interior of bearing housing (110). This drainage capacity makes seal (1) highly efficient in isolating the flow of oil in the outward direction, mainly under severe operating conditions, or in sporadic cases when there is an excess of oil in the bearing housing.

It will be seen that that there is an equivalent drain on the outside of seal (1). The external frontal view (FIG. 3B) shows a drain (D2) at the lowest point on seal (1). Drain (D2) drains all the fluid or moisture pushed against channel (45) of external drainage chamber (4) outwards.

The compact restrictive seal for bearing housings (1) to which this invention relates has a number of advantages in comparison with seals of the labyrinth type which are available on the market.

On the basis of the detailed description provided it will be seen that the compact restrictive seal (1) has three separate protective units:
(i) the labyrinth formed by inner drainage chamber (2),
(ii) the labyrinth formed by outer drainage chamber (4), and
(iii) a high accuracy point of adjustment established between tooth (12) of sleeve (10) and centralising ring (60).

Because of the excellent alignment and because no friction is generated, the labyrinths can be guaranteed to have high durability, accurately maintaining ideal adjustments between their various components, because seal (1) has means for self-alignment, such as the presence of the two "O" sealing rings and restraining ring (30). The presence of these components also makes it possible for it to be fitted as a single piece, and dispenses with use of a press, it being possible to replace the press by a rubber mallet.

The dimensions of the seals are proportional and relate to the diameter of shaft (100), and the shafts of equipment generally lie within a range of diameters from 20 mm to 100 mm.

Thus the thickness range available for the compact restrictive seal for bearing housings (1) can vary in proportion to the diameters of the shafts of equipment, but on average the seal proposed may be from 2 mm to 4 mm thinner than those present on the market.

These thicknesses are very much less than the thicknesses found in the seals known at present, and therefore this new range of working thicknesses will allow the said seal to be applied to centrifugal pumps and other precision equipment.

The invention has been described here with reference to its preferred embodiments. It should however be clear that the invention is not restricted to these embodiments, and those skilled in the art will immediately see that alterations and substitutions may be made within the inventive concept described here.

The invention claimed is:

1. Compact restrictive seal for bearing housings, comprising a circular sleeve (10), a housing (40), labyrinth seals, "O" sealing rings, restraining ring and an outer deflector, which are assembled together in such a way as to form a seal of the labyrinth seals for bearing housings, in which the elements making up the labyrinth seals provide maximum restriction of communication between the internal and external environments of the bearing housing, additionally characterised in that the circular sleeve (10) is closed by a profile in cross-section which is predominantly of a recumbent "J" shape, in which there is a long portion parallel to a shaft (100); a perpendicular portion and a smaller portion (11) also parallel to the shaft (100), an internal wall of sleeve (10) which abuts against the surface of shaft (100) is provided with cavities (10a and 10b) to accommodate "O"-shaped sealing rings (a and b), this same portion which is the larger one has its free extremity directed away from the bearing housing (110) and has two levels of thickness along its entire perimeter: a higher level serving as a tooth (12) supporting and restraining the next component, while the lower level (13) is the base for attachment of the outer deflector (20), at a free extremity there is also a bevel (14) ending in a channel (15); for assembly order, the next element forming the compact restrictive seal (1) is the housing (40) with one of the restraining rings being an expanding restraining ring (50) and other of the resilient rings being a centralising ring (60) fitted; the housing (40) has a profile in cross-section which is predominantly "J" shape, in which there is a longer portion parallel to the shaft (100) is directed towards the interior of the bearing housing (110), where it is fixed; the longer portion (41) of the housing (40) is subdivided into two sections with specific functions, namely: the first section (41a) is distinguished by being wholly beneath the projection of the wall of the bearing housing (110) and the second section (41b) is distinguished by being outside the bearing housing; the first section (41a) is provided on an inner face with two channels (42) and (43), one after the other; the expanding restraining ring (50) is fitted in one of the two channels (43); the expanding restraining ring (50) jointly with other of the two channels (42), the smaller portion (11) of the sleeve (10) and the free extremity of the vertical portion also of the sleeve (10) together form an inner labyrinth seal of the labyrinth seals and an inner drainage chamber (2) along the entire perimeter of the seal (1); the second section (41b) does not wholly abut against the outer wall of the bearing housing (110), being held slightly away from the outer wall of the said bearing housing by a tooth (44) thus forming a channel between the outer wall of the bearing housing (110) and the outer body of the seal (1); a vertical portion of the housing (40) has a shape which mirrors an inner face of the outer deflector (20) and has at least one main channel (45) which together with a tooth (46) form an outer drainage half-chamber (4); a shorter portion of the housing (40), also in a direction parallel to the shaft (100), has a free extremity directed towards the interior of the bearing housing (110); the said free extremity is provided with a toothed cavity (47) around the entire perimeter of the housing (40), the centralising ring (60) being attached to this toothed cavity (47); which in turn has a closed circular shape with a profile in cross-section predominantly of a polygonal shape, preferably comprising an alloy with an alloy which is weaker than that of the material of the sleeve (10); the last component of the seal (1) to be attached is the outer deflector (20) which has a closed circular shape with a profile in cross-section predominantly of an "L" shape in which there is a longer portion that is located perpendicular to the shaft (100) and a free extremity of the longer portion has a bevel (21) of "V" shape, a tooth (22) being provided downstream; this profile presented by the longer limb of the outer deflector (20) combined with the matching profile of the main channel (45) and the tooth (46) of the vertical portion of the housing (40) forming an outer drainage chamber (4); the shorter portion of the outer deflector (20) parallel to the shaft (100) is provided with two channels (23) and (24), one at each extremity of the segment of the portion; the innermost channel (23) is configured to receive one of the "O" sealing rings (c), while the outermost channel (24), preferably of polygonal shape, houses the other of the restraining rings (30); after the seal has been fitted, the other restraining ring is located in an intermediate position between the outermost channel (24) and the channel (15) of the sleeve (10).

2. Compact restrictive seal for bearing housings according to claim 1, characterised in that the centralising ring (60) has a circular format closed by a profile in cross-section which is predominantly of polygonal shape, comprising an alloy of PTFE impregnated with bronze to a percentage of 40% to 70% bronze, preferably 55%.

3. Compact restrictive seal for bearing housings according to claim 1, characterised in that other of the "O" sealing rings (a and b) are located at extremities of the sleeve (10), contributing to substantially perfect axial alignment of the sleeve (10) on the shaft (100).

4. Compact restrictive seal for bearing housings according to claim 1, characterised in that the expanding restraining ring (50) together with the channel (42), the smaller portion (11) of the sleeve (10) and the free extremity of the vertical portion of the sleeve (10) together form the inner labyrinth seal and the inner drainage chamber (2) along the entire inner perimeter of the seal (1).

5. Compact restrictive seal for bearing housings according to claim 1, characterised in that the second section (41b) of the longer portion (41) of the housing (40) which is outside the bearing housing (110) does not wholly abut against the outer wall of the bearing housing (110), being held at a slight distance from the outer wall of the said bearing housing by the tooth (44) thus forming the channel between the outer wall of the bearing housing (110) and the outer body of the seal (1).

6. Compact restrictive seal for bearing housings according to claim 1, characterised in that when the compact restrictive seal (1) is fitted the centralising ring (60) acts as a tool which moves the sleeve (10) into the precise operating position of the said seal.

7. Compact restrictive seal for bearing housings according to claim 1, characterised in that after the initial rotations of the sleeve (10) following fitting of the compact restrictive seal (1) there is planned wear between the contact surface of the centralising ring (60) and the tooth (12) of the sleeve (10) sufficient to prevent friction between the fixed and moving components of the compact restrictive seal (1).

8. Compact restrictive seal for bearing housings according to claim 1, characterised in that after the compact restrictive seal has been fitted the restraining ring (30) is located in an intermediate position between the outermost channel (24) of the outer deflector (20) and the channel (15) of the sleeve (10) and performs two important functions: initially it prevents the outer deflector (20) from going beyond the ideal adjustment position during fitting, and secondly it acts as a tool for removing the sleeve (10).

9. Compact restrictive seal for bearing housings according to claim 1, characterised in that it can be fitted as a single piece, dispensing with the use of a press, and in that a rubber mallet can be used.

* * * * *